June 10, 1958  G. A. BALTUS  2,838,111
DEVICE FOR CUTTING SPACED ELEMENTS
Filed Oct. 31, 1952  3 Sheets-Sheet 1
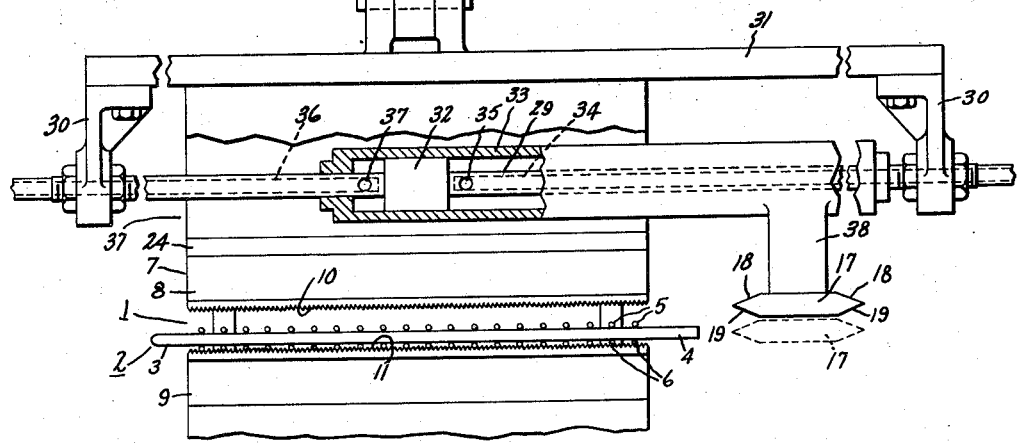
Inventor:
George A. Baltus,
by *Shuridan & Bijs*
His Attorney.

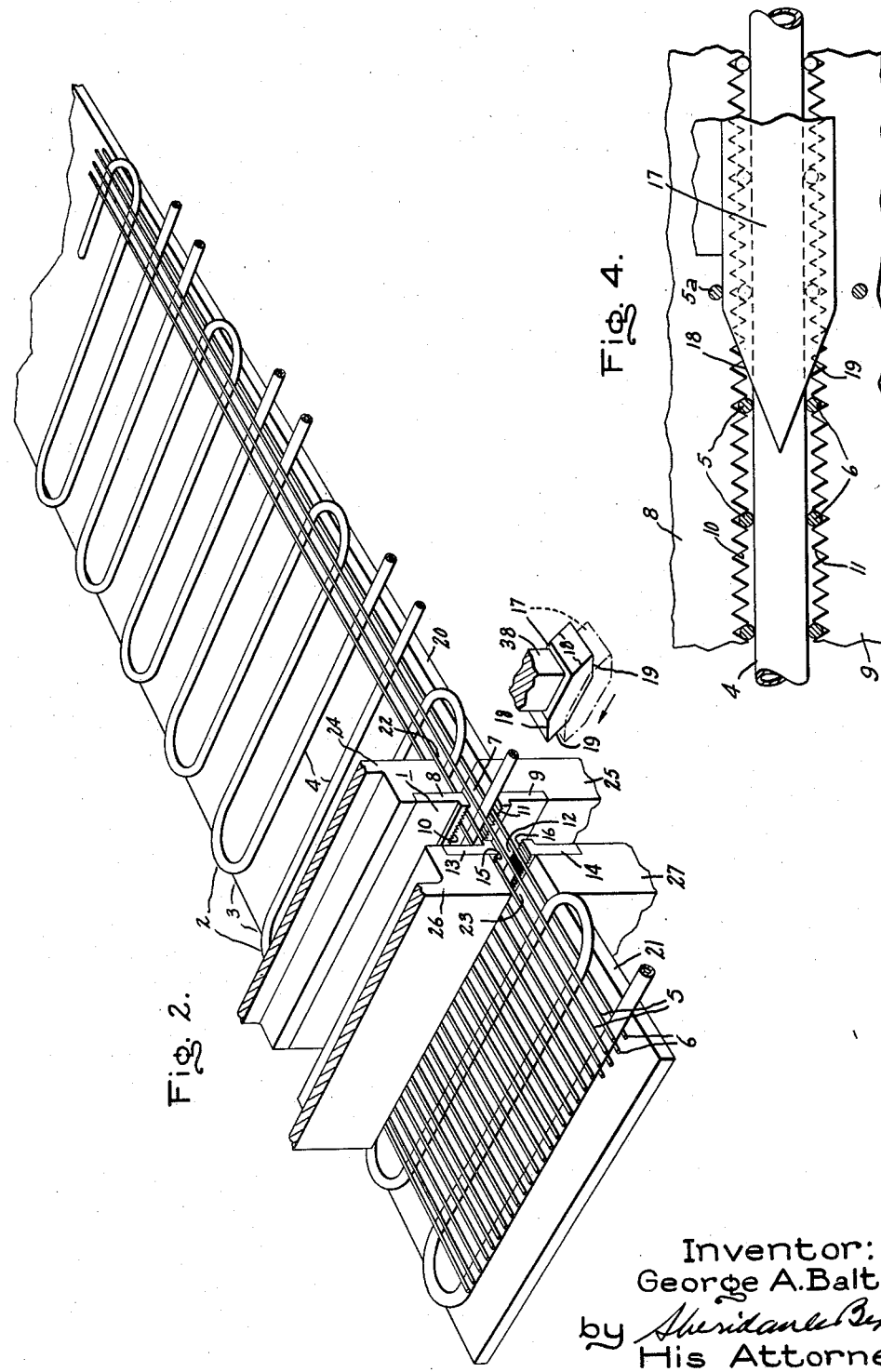

June 10, 1958

G. A. BALTUS 2,838,111

DEVICE FOR CUTTING SPACED ELEMENTS

Filed Oct. 31, 1952

Inventor:
George A. Baltus,
by
His Attorney.

2,838,111

DEVICE FOR CUTTING SPACED ELEMENTS

George A. Baltus, Erie, Pa., assignor to General Electric Company, a corporation of New York Application October 31, 1952, Serial No. 317,958

9 Claims. (Cl. 164—47)

My invention relates to cutting apparatus and pertains more particularly to a device for cutting elements arranged in spaced-apart planes.

In the manufacture of some articles, production can be increased and simplified when a number of these articles are fabricated in a connected series and separated seriatim after certain ones or all of the steps required in manufacturing the articles have been completed. In order to be able to take full advantage of this method of manufacture, means must be provided for separating or disconnecting the articles at least as quickly as they are produced. Usually a simple shearing arrangement involving a movable shearing member on one side of the article and a stationary shearing member on the other side will operate satisfactorily for quickly cutting the connections between the articles. Sometimes, however, the articles when completed are connected by elements or portions of elements arranged in a pair of spaced-apart planes. When this is the case, the above-mentioned simple type of shearing arrangement will not suffice, since the elements in only one of the planes would be engaged or backed up by the stationary shearing member when the movable shearing member is moved into engagement therewith. Such an arrangement would, of course, be effective for cutting the elements in both planes eventually after the elements first engaged by the movable shearing member were moved into the plane of the others and into shearing engagement with the stationary shearing member. This, however, would result in the ends of the first elements being bent toward and cut longer than the others. Bending of the first elements in this manner is undesirable in that it would exert a crushing force on those parts of the articles disposed between the spaced elements and adjacent the point at which the cutting would take place. Additionally, it is often desirous that the articles be finished by bending the cut ends of the elements in both planes inwardly. Uneven cutting of the elements in the two planes is undesirable in that it would make this finishing operation more difficult. Accordingly, the primary object of my invention is to provide a new and improved device for cutting elements arranged in spaced-apart planes.

Another object of my invention is to provide in a new and improved device for cutting elements arranged in a pair of spaced-apart planes means for engaging or backing up the elements in both planes for permitting the elements in both planes to be cut by movable shearing means evenly and without bending the elements during the cutting operation.

Still another object of my invention is to provide in a new and improved device for cutting portions from elements arranged in a pair of spaced-apart planes means for facilitating the finishing of the cut ends of the elements.

Further objects and advantages of my invention will become apparent as the following description proceeds and the features of novelty which characterize my invention will be pointed out with particularity in the claims annexed to and forming part of this specification.

In carrying out the objects of my invention, I provide two spaced-apart pairs of opposed shearing members. In one form of my invention the opposed shearing members are movable into clamping engagement with the outer sides of the spaced elements to be cut and a tapered shearing member is movable between the two pairs of opposed shearing members for shearing engagement therewith. In another form of my invention the opposed shearing members are operable toward each other and a cutter bar is insertable between the spaced elements for cooperating with and being in shearing engagement with the opposed shearing members when the opposed shearing members are operated toward each other. In the latter form, the opposed shearing members include forming surfaces for finishing the cut ends of the elements.

For a better understanding of my invention, reference may be had to the accompanying drawing in which Fig. 1 is a fragmentary front elevational view illustrating the first embodiment of my invention and apparatus employable for actuating the various components of the first embodiment;

Fig. 2 is a fragmentary perspective view illustrating the first embodiment of my invention and the type of articles on which the device of my invention is particularly adapted to operate;

Fig. 3 is an enlarged fragmentary perspective view of the first embodiment and the articles to be separated thereby;

Fig. 4 is an enlarged fragmentary sectional view illustrating the manner in which cutting is effected by the first embodiment;

Figure 5:
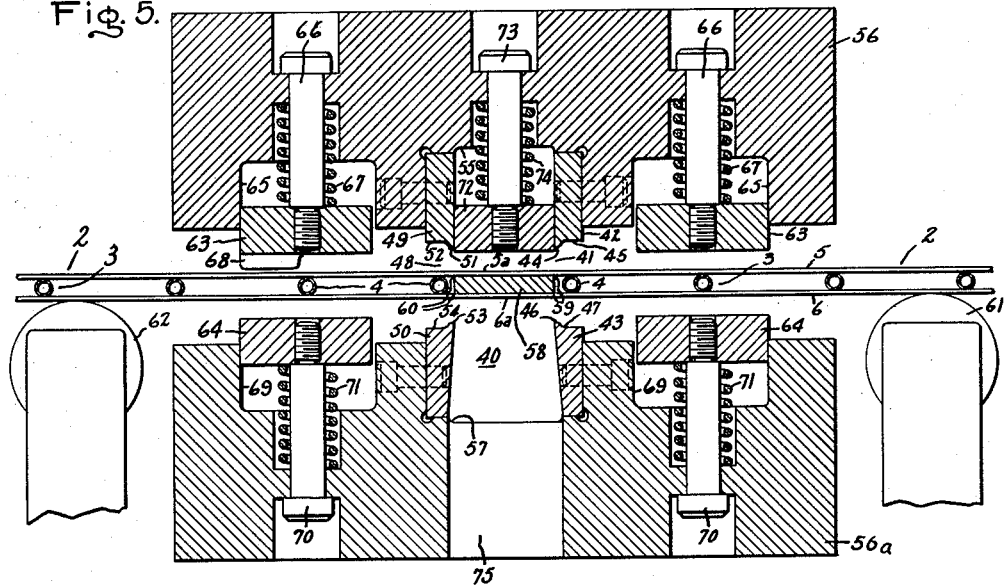
Fig. 5 is a sectional view of a second embodiment of my invention illustrating the components thereof in their inoperative positions.

Referring to Figs. 1 and 2, I have shown a first embodiment of my cutting device generally designated 1, employed for separating a plurality of refrigerator condensers 2, which had been formed in a connected series. Each of the condensers 2 comprises a conduit 3 bent in serpentine form and including a plurality of passes 4, a first plurality of laterally spaced-apart wires or elongated elements 5 secured, as by welding, to one side of the conduit 3, and a second plurality of laterally spaced-apart wires or elongated elements 6 secured, also as by welding, to the other side of the conduit 3. For convenience of reference, the wires 5 will hereinafter be referred to as the upper wires 5 and the wires 6 will be referred to as the lower wires 6.

It will be seen that in order to be able to take full advantage of this method of forming the condensers 2, the condensers must be separated or disconnected at least as quickly as they can be formed. This disconnection of the condensers 2 may be inexpensively and quickly effected by shearing or cutting the wires 5 and 6 intermediate the adjacent end passes of adjacent ones of the conduits 3. However, it will be seen further that in the connected series of condensers, the upper wires 5 and the lower wires 6 are arranged in a pair of spaced-apart planes. Therefore, the portions of the wires intermediate the end passes of adjacent conduits must be sheared in such a manner as not to apply a crushing force to the end passes of the conduit. Additionally, in order to facilitate subsequent finishing of the ends of the condensers 2, the wires 5 and 6 must be cut evenly and not bent during the actual shearing thereof. This my cutting device 1 accomplishes.

The cutting device 1 includes a first pair of opposed dies or shearing members 7. The first pair of dies 7 comprises an upper die 8 and a lower die 9. As perhaps best seen in Figs. 3 and 4, the upper die 8 includes a serrated shearing edge 10. The serrations in the shearing edge 10 are provided for receiving the upper wires 5 of the condensers 2. The lower die 9 includes a serrated shearing edge 11. The serrations in the shearing edge 11 are provided for receiving the lower wires 6 of the condensers 2. The cutting device 1 includes further a second pair of opposed dies or shearing members 12, which is spaced apart from the first pair 7 an amount corresponding to the length of the portions to be cut from the wires intermediate the adjacent end passes of adjacent ones of the condensers 2. Additionally, the spacing is such as to place the dies above and below the adjacent end passes of the condensers during the cutting of the intermediate portions of the wires 5 and 6.

The second pair of dies 12 is similar to the first pair 7 and comprises an upper die 13 and a lower die 14. The upper die 12 includes a serrated shearing edge 15. The lower die 14 includes a serrated shearing edge 16. The serrations in the shearing edges 15 and 16 are provided for receiving the upper and lower wires 5 and 6, respectively.

The upper dies 8 and 13 are adapted for being held in clamping engagement with the outer sides of the upper wires 5 above the adjacent end passes of adjacent ones of the condensers 2 in the manner shown in Figs. 3 and 4. When the upper dies 8 and 13 are so positioned the upper wires 5 are held firmly in the serrations in the shearing edges 10 and 15, respectively. Similarly, the lower dies 9 and 14 are adapted for being held in clamping engagement with the outer sides of the lower wires 6 below the adjacent end passes of adjacent ones of the condensers 2 in the manner also shown in Figs. 3 and 4. When the lower dies 9 and 14 are so positioned, the lower wires 6 are firmly held in the serrations in the shearing edges 11 and 16, respectively.

Provided for commonly cooperating with the first and second pairs of opposed dies is a movable cutter or shearing member 17. The cutter 17 is tapered at both ends. Each end of the cutter includes an upper pair of inclined shearing edges 18 and a lower pair of inclined shearing edges 19. The width of the cutter is such that the cutter is movable intermediate the first and second pairs of opposed dies with a close fit. When the cutter 17 is moved between the dies, one of the upper shearing edges 18 moves in shearing engagement with the shearing edge 10 of the upper die 8 of the first pair of dies 7 and the other of the upper shearing edges 18 moves in similar engagement with the shearing edge 15 of the upper die 13 of the second pair of opposed dies 12. Simultaneously, one of the lower shearing edges 19 of the cutter 18 moves in shearing engagement with the shearing edge 11 of the lower die 9 of the first pair of opposed dies 7 and the other of the lower shearing edges 19 moves in shearing engagement with the shearing edge 16 of the lower die 14 of the second pair of opposed dies 12.

In summary, operation of my cutting device involves first, positioning the condensers 2 between the first and second pairs of opposed dies 7 and 12 so that the end pass of one of the condensers 2 is positioned between the opposed dies of the first pair of dies 7 and that the adjacent end pass of the adjacent condenser 2 is positioned between the opposed dies of the second pair 12. Thereafter, the upper dies 8 and 13 are held in clamping engagement with the upper wires 5, the upper wires 5 being securely held in the serrations in the cutting edges of the upper dies; and the lower dies 9 and 14 are held in clamping engagement with the lower wires 6, the lower wires 6 being securely held in the serrations in the cutting edges of the lower dies.

The intermediate portions to be cut from the upper wires 5 are designated 5a in Figs. 3 and 4 and are defined by the shearing edges 10 and 15 of the upper dies 8 and 13, respectively. The intermediate portions to be cut from the lower wires 6 are designated 6a in Figs. 3 and 4 and are defined by the shearing edges 11 and 16 of the lower dies 9 and 14, respectively.

Following clamping of the wires in the above-described manner either of the tapered ends of the cutter 17 is insertable between the intermediate portions 5a and 6a of the spaced pluralities of wires 5 and 6, respectively, and the cutter may be advanced between the spaced pairs of opposed dies. Initially, the tapered end of the cutter 17 is insertable between opposed ones of the intermediate portions 5a and 6a. However, as the cutter advances between the pairs of opposed dies, the upper inclined shearing edges 18 of the cutter 17 traverse the plane in which the upper wires 5 are arranged and move into shearing engagement with the shearing edges 10 and 15 of the upper dies 8 and 13, respectively. Thus, the intermediate portions 5a of the upper wires 5 are cut from the upper wires in the manner shown in Fig. 4. Simultaneously, the lower inclined edges 19 of the cutter traverse the plane in which the lower wires 6 are arranged and move into shearing engagement with the shearing edges 11 and 16 of the lower dies 9 and 14, respectively. Thus, the intermediate portions 6a of the lower wires 6 are cut from the lower wires also in the manner shown in Fig. 4. In this manner, my device 1 is effective for separating or disconnecting inexpensively and quickly adjacent ones of the condensers 2. It will be seen that by having both ends of the cutter 17 tapered, the cutter 17 may be employed for separating a pair of adjacent condensers as it is advanced between the pairs of opposed dies in one direction and separating the succeeding pair of adjacent condensers as it is returned or advanced oppositely. Thus the separation or disconnection of the connected condensers may be expedited.

In Figs. 1 and 2, I have shown apparatus employable for supporting the connected condensers 2, for moving the opposed dies into clamping engagement with the condenser wires and for advancing the movable cutter 17 between the two pairs of opposed dies. This apparatus includes a first supporting surface 20 and a spaced-apart second supporting surface 21. Disposed in the space between the supporting surfaces 20 and 21 are spaced-apart first and second pairs of die blocks 22 and 23, respectively. The first pair of die blocks 22 comprises an upper block 24 for having the upper die 8 of the above-mentioned first pair of dies 7 suitably secured thereto and a lower block 25 for having the lower die 9 of the first pair of opposed dies 7 suitably secured thereto. The second pair of die blocks 23 comprises an upper block 26 for having the upper die 13 of the above-mentioned second pair of dies 12 suitably secured thereto and a lower block 27 for having the lower die 14 of the second pair of dies 12 suitably secured thereto. The upper blocks 24 and 26 are adapted for vertical movement guided by suitable means (not shown) and the lower blocks 25 and 27 are suitably secured to a stationary member, such as a machine bed (not shown). The upper blocks are integrally connected and by means of a connecting link 28 and other suitable operating means (not shown) the upper blocks 24 and 26 are caused to reciprocate between upper and lower positions and to dwell a predetermined time in the lower position. When the upper blocks are moved to the upper position, the above-mentioned upper dies 8 and 13 and lower dies 9 and 14 are positioned apart. During this time stepping means (not shown) are effective for moving the connected condensers 2 longitudinally along the supporting surfaces 20 and 21 and positioning the end pass of one of the condensers 2 between the opposed dies 8 and 9 and the adjacent end pass of the adjacent condenser between the opposed dies 13 and 14. Thereafter, when the upper blocks are moved toward the lower blocks, the upper dies 8 and 13 are moved into clamping engagement with the upper wires 5 of the condensers 2 and the lower dies 9 and 14 similarly engage the lower wires 6. Thus the wires 5 and 6 are clamped between the dies in preparation for advancement of the cutter 17 between the pairs of opposed dies and cutting of the intermediate portions 5a and 6a from the wires in the manner described above.

Also included in the apparatus shown in Figs. 1 and 2 is an arrangement for advancing the cutter 17 between the pairs of dies. This arrangement includes a piston rod 29 secured adjacent its ends between brackets 30. The brackets 30 are formed of a horizontal bar 31 suitably secured to the upper blocks 24 and 26 and adapted to move reciprocatingly therewith. Fixedly carried on the piston rod 29 intermediate its ends is a piston 32. Slidingly movable on the piston rod 29 for cooperating with the piston 32 is a cylinder 33. An axial bore 34 extending from the right side extremity of the piston rod 29, as viewed in Fig. 1, terminates adjacent the corresponding head of the piston 32. A diametrical bore 35 in the rod 29 provides communication between the axial bore 34 and the interior of the cylinder 33 on the corresponding side of the piston 32. Another axial bore 36 extends from the opposite or left side extremity of the piston rod 29 to a point adjacent the corresponding opposite head of the piston 32. Another diametrical bore 37 provides communication between the bore 36 and the interior of the cylinder 33 on the corresponding opposite side of the piston 32.

Formed integrally with the cylinder 33 is a pendent arm 38, to which is suitably secured the cutter 17. By this arrangement the cutter 17 moves from the raised position shown in solid lines to the lowered position shown in dash lines in Figs. 1 and 2 when the upper die blocks are moved toward the lower die blocks for clamping the wires between the opposed dies. When the cutter 17 is lowered, it is effectively positioned for insertion between the intermediate portions 5a and 6a of the wires and for advancement of the cutter between the pairs of opposed dies.

By means not shown, fluid is supplied under pressure alternately into the bores 34 and 36 from the extremities of the piston rod 29. In this manner, the cylinder 33 is actuated first in one direction, and then in the other whereby the cutter 17 is advanced between the pairs of dies first in one direction and then in the opposite direction. The alternate actuation of the cylinder 33 is in timed relation with the means provided for stepping the connected series of condensers 2 along the supporting surfaces 20 and 21. As a result, one tapered end of the cutter 17 is effective for disconnecting one adjacent pair of condensers when the cutter is advanced between the dies in one direction and the opposite tapered end of the cutter 17 is effective for disconnecting the succeeding adjacent pair of condensers when the cutter is advanced oppositely between the dies.

Figure 6:
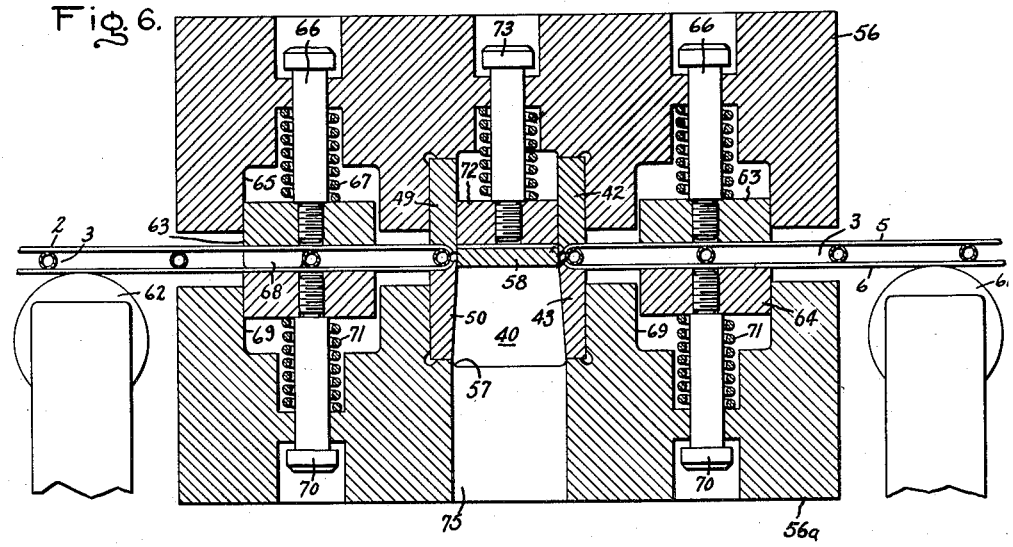
Fig. 6 is a sectional view of the second embodiment illustrating the components thereof in their operative positions.

In Figs. 5 and 6, I have shown a second embodiment of my cutting device generally designated 40 and also employed for separating seriatim a plurality of refrigerator condensers 2, which have been formed in a connected series. The condensers 2 are identical in construction to those described above, and like numerals refer to like parts. The cutting device 40 includes a first pair of opposed dies or shearing members 41. The first pair of dies 41 comprises an upper die 42 and a lower die 43. The upper die 42 includes a shearing edge 44 and a forming surface 45. The lower die 43 includes a shearing edge 46 and a forming surface 47. The cutting device 40 further includes a second pair of opposed dies or shearing members 48 which is spaced apart from the first pair 41 an amount corresponding to the lengths of the intermediate portions 5a and 6a to be cut from the wires 5 and 6, respectively. The second pair of dies 48 is similar to the first pair 41 and comprises an upper die 49 and a lower die 50. The upper die 49 includes a shearing edge 51 and a forming surface 52. The lower die 50 includes a shearing edge 53 and a forming surface 54.

The upper dies 42 and 49 may be suitably secured to the opposed sides of a channel 55 formed across the underside of a vertically movable upper die block 56. The lower dies 43 and 50 may be suitably secured to the opposed sides of a similar channel 57 formed across the upper side of a vertically movable lower die block 56a. By this arrangement the cutting edges of the two pairs of dies are spaced apart an amount corresponding to the portions 5a and 6a to be cut from the wires. Additionally, with this arrangement the opposed dies may be operated toward each other.

Provided for cooperating commonly with the shearing edges of the upper and lower dies of the first and second pairs of opposed dies is a shearing member or cutter bar 58. The cutter bar 58 is rectangular in cross-section including on one side opposed shearing edges 59 for shearing engagement with the shearing edges 44 and 46 of the upper and lower dies 42 and 43, respectively, of the first pair of opposed dies 41. The opposite side of the cutter bar 58 includes opposed shearing edges 60 for shearing engagement with the shearing edges 51 and 53 of the upper and lower dies 49 and 50, respectively, of the second pair of dies 48.

The die blocks carrying the cutting device 40 may be arranged to operate between spaced-apart and suitably supported rollers 61 and 62 on which the connected condensers 2 are longitudinally movable. By operation of means not shown but which may be similar to the apparatus shown in Figs. 1 and 2 and described above, the upper and lower die blocks may be alternately positioned apart and operated toward each other whereby the opposed dies would be alternately positioned apart and operated toward each other. Positioning the upper and lower dies apart in this manner permits the condensers 2 to be moved on the rollers 61 and 62 and positioned between the dies.

Provided for holding the condensers 2 in position between the dies are pairs of upper and lower pressure pads 63 and 64, respectively. The upper pressure pads 63 are disposed in channels 65 formed across the underside of the upper die block 56 on either side of the channel 55. By means of pluralities of studs 66 and coil springs 67, only one of each of which is shown with each pressure pad 63, the pressure pads 63 are adapted for resilient engagement with the upper wires 5 when the upper block 56 is operated toward the condensers. Formed off the pressure pad 63 is a plurality of members or fingers 68 only one of which is shown. The fingers 68 are positioned between the upper wires 5 of the condenser to be cut off and engage one of the passes thereof when the die blocks are operated toward each other. This arrangement insures satisfactory positioning of the condensers relative to the cutting edges of the dies and prevents movement of the condenser being cut off during the cutting operation. The succeeding condenser is held firmly by the mechanism (not shown) whereby the condensers are moved on the rollers 61 and 62.

The lower pressure pads 64 are disposed in channels 69 formed across the upper side of the lower die block 56a on either side of the channel 57. By means of studs 70 and coil springs 71, the pressure pads 64 are adapted for resiliently engaging the lower wires 6 when the lower block 56a is operated toward the condensers.

Prior to operating the blocks toward each other, the cutter bar 58 is inserted between the intermediate portions 5a and 6a of the wires in the manner shown in Figs. 5 and 6 and held positioned therebetween for cooperation with the cutting edges of the opposed dies. This insertion and positioning of the cutter bar 58 between the intermediate wire portions 5a and 6a may be satisfactorily effected by means similar to that employed with the first-described embodiment for operating the cutter 17 and shown in Figs. 1 and 2. Following insertion and positioning of the cutter bar 58, the upper and lower die blocks 56 and 56a are operated toward each other. This brings the cutting edges 44 and 46 on the upper and lower dies 42 and 43, respectively, of the first pair of opposed dies 41 into simultaneous shearing engagement with the opposed shearing edges 59 of the cutter 58. Simultaneously, the shearing edges 51 and 53 of the upper and lower dies 49 and 50, respectively, of the second pair of opposed dies 48 are brought into shearing engagement with the opposed edges 60 of the cutter bar 58. Thus the intermediate portions 5a and 6a are cut from the wires 5 and 6, respectively. Following the actual cutting of the wires in the just-described manner, the upper and lower dies are further operated toward each other to the positions thereof shown in Fig. 6. In this manner, the forming surfaces 45 and 47 of the first pair of opposed dies 41 bend inwardly the cut ends of the wires of one of the pair of adjacent condensers for thereby finishing the edge of that condenser. Simultaneously, and in an identical manner, the forming surfaces 52 and 54 of the second pair of dies 48 bend inwardly the cut ends of the wires of the other of the pair of adjacent condensers, thereby to finish the edge thereof.

Provided for dislodging the cut portions 5a and 6a from between the dies is an ejector bar 72. The ejector bar 72 extends and is vertically movable between the inner surfaces of the upper dies 42 and 49.

By means of a plurality of studs 73 having coil springs 74 fitted thereon, only one of each of which is shown, the ejector bar 72 is biased downwardly to the position of Fig. 5. When the upper and lower dies are operated toward each other and into engagement with the shearing edges on the cutter bar 58, the spring 74 is composed and the ejector bar assumes the position of Fig. 6. Following the cutting and forming operations and before the die blocks are operated apart, the cutter bar is removed permitting the spring 74 to actuate the ejector bar 72 downwardly from the position of Fig. 6, whereby the wire portions 5a and 6a are ejected downwardly through a suitable opening 75 in the lower die block 56a.

It is to be understood that while I have shown and described both embodiments of my invention as being employable for cutting intermediate portions from pluralities of wires arranged in spaced-apart planes, my invention is equally employable for cutting intermediate portions from other elements arranged in spaced-apart planes, such as sheets of material. Additionally, while I have shown and described both embodiments of my invention as including two spaced-apart pairs of opposed shearing members for cutting intermediate portions from spaced-apart elements, the pairs of opposed shearing members could be employed singly and adapted for cutting other than intermediate portions from elements arranged in spaced-apart planes.

While I have shown and described specific embodiments of my invention, I do not desire my invention to be limited to the particular forms shown and described and I intend by the appended claims to cover all modifications within the spirit and scope of my invention.

What I claim as new and desire to secure by Letters Patent of the United States is:

1. In a device for cutting intermediate portions from pluralities of elements arranged in a pair of spaced apart planes, a first pair of opposed shearing members, a second pair of opposed shearing members spaced from said first pair, said opposed shearing members being adapted for having the spaced elements positioned therebetween, one of said shearing members in each of said pairs arranged to engage all of said elements in one plane and one of said shearing members in each of said pairs arranged to engage all of said elements in said other plane, a tapered shearing member, said tapered shearing member being movable between the portions of said spaced elements intermediate said first and second pairs of opposed shearing members, said tapered shearing member being movable into simultaneous shearing engagement with said first and second pairs of opposed shearing members for cutting said intermediate portions from all of said spaced elements.

2. In a device for cutting intermediate portions from pluralities of elements arranged in a pair of spaced-apart planes, a first pair of dies, said first pair of dies including a first pair of opposed shearing edges, a second pair of dies spaced from said first pair of dies, said second pair of dies including a second pair of opposed shearing edges, said dies being adapted for being held in clamping engagement with the outer sides of the elements arranged in said spaced-apart planes, one of said dies in each of said pairs of dies having a shearing edge arranged to engage all of said elements in one plane and one of said dies in each of said pairs of dies having a shearing edge arranged to engage all of said elements in the other plane, and a cutter, said cutter including tapered shearing edges for cooperating with said first and second pairs of opposed shearing edges, said cutter being movable between said first and second pairs of dies, said tapered shearing edges being in shearing engagement with the opposed shearing edges of both said first and second pairs of dies when said opposed shearing edges are in clamping engagement with said elements and during movement of said cutter between said first and second pairs of dies for cutting from all of said elements arranged in both of said spaced-apart planes the portions of said elements disposed intermediate said first and second pairs of dies.

3. In a device for cutting intermediate portions from pluralities of elements arranged in a pair of spaced-apart planes, a first pair of dies, said first pair of dies including a first pair of opposed shearing edges, a second pair of dies spaced from said first pair of dies, said second pair of dies including a second pair of opposed shearing edges, said dies being adapted for being held in clamping engagement with the outer sides of the elements arranged in said spaced-apart planes, and a cutter movable back and forth between said first and second pairs of dies and on a line intermediate said spaced apart planes of said elements, said cutter being tapered at both ends to form a first pair of inclined shearing edges on one side thereof at both ends of said cutter and a second pair of inclined shearing edges on the other side thereof at both ends of said cutter for cooperating with said first and second pairs of opposed shearing edges of said dies, each of said inclined shearing edges on one end of said cutter respectively engaging the shearing edge of one of said first and second pairs of dies when said opposed shearing edges are in clamping engagement with said elements and during movement of said cutter in either direction between said first and second pairs of dies for cutting from all of said elements arranged in both said spaced-apart planes the portions of said elements disposed intermediate said first and second pairs of dies.

4. In a device for cutting intermediate portions from pluralities of wires arranged in a pair of spaced-apart planes, a first pair of dies, said first pair of dies including a first pair of opposed shearing edges, each of said first pair of opposed shearing edges being serrated, the serrations in each of said first pair of shearing edges being adapted for receiving the wires arranged in one of said planes, at least one of said first pairs of dies being movable toward the other for clamping said wires in said serrations in said first pair of opposed shearing edges, a second pair of dies, said second pair of dies including a second pair of opposed shearing edges, each of said second pair of opposed shearing edges being serrated, the serrations in each of said second pairs of shearing edges being adapted for receiving the wires arranged in one of said planes, at least one of said second pairs of dies being movable toward the other for clamping said wires in said serrations in said second pair of opposed shearing edges, and a cutter, said cutter being tapered to form a first pair of inclined shearing edges on one side thereof and a second pair of inclined shearing edges on the other side thereof for cooperating with said first and second pairs of opposed serrated shearing edges, said cutter being movable between said first and second pairs of dies and on a line intermediate said spaced apart planes of said elements, said inclined shearing edges being in shearing engagement with each serration independently in both said first and second pairs of opposed shearing edges when said wires are clamped in said serrations and during movement of said cutter between said dies whereby a greater shearing angle is created for cutting from the pluralities of wires arranged in both of said spaced-apart planes the portions of said wires intermediate said first and second pairs of dies.

5. In a device for cutting intermediate portions from pluralities of wires arranged in a pair of spaced-apart planes, a first pair of dies, said first pair of dies including a first pair of opposed shearing edges, each of said first pair of opposed shearing edges being serrated, the serrations in each of said first pair of shearing edges being adapted for receiving the wires arranged in one of said planes, at least one of said first pair of dies being movable toward the other for clamping said wires in said serrations in said first pair of opposed shearing edges, a second pair of dies, said second pair of dies including a second pair of opposed shearing edges, each of said second pair of opposed shearing edges being serrated, the serrations in each of said second pairs of shearing edges being adapted for receiving the wires arranged in one of said planes, at least one of said second pair of dies being movable toward the other for clamping said wires in said serrations in said second pair of opposed shearing edges, and a cutter movable back and forth between said first and second pairs of dies and along a path intermediate said spaced apart planes of said elements, said cutter being tapered at both ends to form a first pair of inclined shearing edges on one side thereof at both ends of said cutter and a second pair of inclined shearing edges on the other side thereof at both ends of said cutter for cooperating with said first and second pairs of opposed serrated shearing edges, the inclined shearing edges at one of said ends of said cutter being in shearing engagement with each serration independently in the opposed shearing edges of both said first and second pairs of dies when said wires are clamped in said serrations and during movement of said cutter in either direction between said dies whereby a greater shearing angle is created for cutting from the pluralities of wires arranged in both said spaced-apart planes the portions of said wires intermediate said first and second pairs of dies.

6. In a device for cutting intermediate portions from pluralities of elements arranged in a pair of spaced apart planes, a first pair of opposed shearing members, a second pair of opposed shearing members spaced from said first pair, said opposed shearing members being positionable apart for having the spaced elements positioned therebetween, one of said shearing members in each of said pairs arranged to engage all of said elements in one plane and one of said shearing members in each of said pairs arranged to engage all of said elements in said other plane, and a cutter, said cutter being insertable between said spaced elements intermediate said first and second pairs of opposed shearing members, said cutter having opposed shearing edges for cooperating with said first and second pairs of opposed shearing members, said first and second opposed shearing members and said cutter being relatively movable into shearing engagement for cutting said intermediate portions from all of said spaced elements.

7. In a device for cutting portions from elements arranged in a pair of spaced-apart planes, a pair of dies, said dies including opposed shearing edges, said dies further including opposed forming surfaces adjacent said shearing edges, said dies being positionable apart for having the elements arranged in said spaced-apart planes positioned therebetween, said dies being operable toward each other, and a cutter bar, said cutter bar being insertable between said elements arranged in said spaced-apart planes, said cutter bar having opposed shearing edges for cooperating with said opposed shearing edges of said dies, said opposed shearing edges of said cutter bar being in simultaneous shearing engagement with said opposed shearing edges of said dies when said cutter bar is inserted between said elements and when said dies are operated toward each other for cutting said portions from said elements, said forming surfaces of said dies forming the cut ends of said elements.

8. In a device for cutting intermediate portions from elements arranged in a pair of spaced-apart planes, a first pair of dies, said first pair of dies including opposed shearing edges and forming surfaces adjacent thereto, a second pair of dies, said second pair of dies including opposed shearing edges and forming surfaces adjacent thereto, said first and second pairs of dies being spaced apart, said dies of each of said pairs being positionable apart for having the elements arranged in said spaced-apart planes positioned therebetween, said dies of each of said pairs being operable toward each other, and a cutter bar, said cutter bar being insertable between said elements arranged in said spaced-apart planes intermediate said first and second pairs of dies, said cutter bar having opposed shearing edges for cooperating with said opposed shearing edges of each of said pairs of dies, said opposed shearing edges of said cutter bar being in simultaneous shearing engagement with said opposed shearing edges of each of said pair of dies when said cutter bar is inserted between said elements intermediate said first and second pairs of dies and when said dies are operated toward each other for cutting said intermediate portions from said elements, said forming surfaces of said dies forming the cut ends of said elements.

9. In a device for cutting intermediate portions from elements arranged in a pair of spaced-apart planes, a first pair of dies, said first pair of dies including opposed shearing edges and forming surfaces adjacent thereto, a second pair of dies, said second pair of dies including opposed shearing edges and forming surfaces adjacent thereto, said first and second pairs of dies being spaced apart, said dies of each of said pairs being positionable apart for having the elements arranged in said spaced-apart planes positioned therebetween, said dies of each of said pairs being operable toward each other, a cutter bar, said cutter bar being insertible between said elements arranged in said spaced-apart planes intermediate said first and second pairs of dies, said cutter bar having opposed shearing edges for cooperating with said opposed shearing edges of each of said pairs of dies, said opposed shearing edges of said cutter bar being in simultaneous shearing engagement with said opposed shearing edges of each of said pairs of dies when said cutter bar is inserted between said elements intermediate said first and second pairs of dies and when said dies are operated toward each other for cutting said intermediate portions from said elements, said forming surfaces of said dies forming the cut ends of said elements, and members movable with at least one of said dies and maintaining said elements in satisfactory cutting positions during cutting of said intermediate portions from said elements and forming of said ends of said elements.

(References on following page)

References Cited in the file of this patent

UNITED STATES PATENTS

| | | |
|---|---|---|
| 1,161,705 | Lloyd | Nov. 23, 1915 |
| 1,715,138 | Lothrop | May 28, 1929 |
| 2,214,870 | West | Sept. 17, 1940 |
| 2,516,602 | Snyder | July 25, 1940 |
| 2,613,740 | Drain | Oct. 14, 1952 |

FOREIGN PATENTS

| 283,479 | Italy | Mar. 12, 1931 |
|---|---|---|